US012605957B2

(12) United States Patent
Shih

(10) Patent No.: US 12,605,957 B2
(45) Date of Patent: Apr. 21, 2026

(54) STAMP WITH CUTTING ELEMENT

(71) Applicant: SUN SAME ENTERPRISES CO., LTD., Tainan (TW)

(72) Inventor: Wen-Jer Shih, Tainan (TW)

(73) Assignee: SUN SAME ENTERPRISES CO., LTD. (TW)

( * ) Notice: Subject to any disclaimer, the term of this patent is extended or adjusted under 35 U.S.C. 154(b) by 0 days.

(21) Appl. No.: 18/939,512

(22) Filed: Nov. 6, 2024

(65) Prior Publication Data

US 2026/0048603 A1 Feb. 19, 2026

(30) Foreign Application Priority Data

Aug. 15, 2024 (TW) ................................ 113130627

(51) Int. Cl.

*B41K 1/36* (2006.01)
*B26D 1/08* (2006.01)
*B41K 1/00* (2006.01)

(52) U.S. Cl.

CPC ............. *B41K 1/003* (2013.01); *B26D 1/085* (2013.01); *B41K 1/006* (2013.01)

(58) Field of Classification Search

None

See application file for complete search history.

(56) References Cited

U.S. PATENT DOCUMENTS 1,061,862 A 5/1913 Molt.
5,105,738 A 4/1992 Mehaffey
9,272,556 B1 3/2016 Shih

FOREIGN PATENT DOCUMENTS

| | | | | |
|---|---|---|---|---|
| AT | 525964 B1 | * 10/2023 | | B41K 3/68 |
| CN | 214727594 U | * 11/2021 | | |
| KR | 20120003034 U | * 5/2012 | | B42D 25/30 |
| WO | WO-2012108515 A1 | * 8/2012 | | B41K 1/44 |

OTHER PUBLICATIONS

English translation of CN 214727594 U, publication date Nov. 16, 2021. (Year: 2021).*
English translation of AT 525964 B1, publication date Oct. 15, 2023. (Year: 2023).*
English translation of KR 20120003034 U, publication date May 3, 2012. (Year: 2012).*
English translation of WO 2012/108515 A1, publication date Aug. 16, 2012. (Year: 2012).*
Non-Published Commonly Owned U.S. Appl. No. 18/939,515, "Stamp", Filed on Nov. 6, 2024, Sun Same Enterprises Co., Ltd.

* cited by examiner

*Primary Examiner* — Leslie J Evanisko
(74) *Attorney, Agent, or Firm* — SU IP CONSULTING

(57) ABSTRACT

An example stamp with a cutting element is disclosed. The stamp includes a main shell and a cutting element in the main shell. The cutting element further includes a control part, a push member, and a cutting part. The push member is configured to engage with the control part and move between a first position on a side of the main shell and a second position on the same side. The cutting part is configured to protrude from a corner region of the main shell in response to a movement of the push member from the first position to the second position.

10 Claims, 12 Drawing Sheets

STAMP WITH CUTTING ELEMENT

CROSS-REFERENCE TO RELATED APPLICATIONS

The present application claims the benefit of Taiwan Application No. 113130627, filed Aug. 15, 2024, and is also related in subject matter to U.S. patent application Ser. No. 18/939,515. The Taiwan application and U.S. application specified above are incorporated herein by reference.

BACKGROUND

Unless otherwise indicated herein, the approaches described in this section are not prior art to the claims in this application and are not admitted to be prior art by inclusion in this section.

One common way to confirm receipt of a package is to press a stamp on the package with certain information (e.g., the date of receipt). Typically, a separate cutting tool (e.g., scissors) is used to cut open the package. In other words, a person handling this received package would need to stamp the package with a first device, put the first device away, and then use a second device to cut open the package. As the number of packages needing handling goes up, the aforementioned process of stamping and cutting becomes increasingly burdensome and inefficient.

Thus, there is a need to develop a stamp with a cutting element that is safe and simple to use.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are therefore not to be considered limiting of its scope. The disclosure will be described with additional specificity and detail through use of the accompanying drawings.

DETAILED DESCRIPTION

Figure 1A:
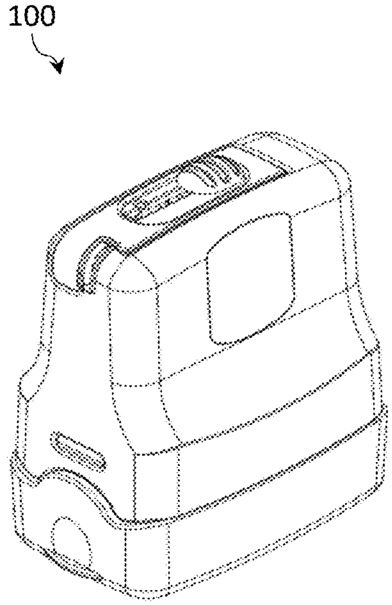
FIG. 1A illustrates a perspective view of a stamp.

In the following detailed description, reference is made to the accompanying drawings, which form a part hereof. In the drawings, similar symbols typically identify similar components and same numerals typically identify same components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1B:
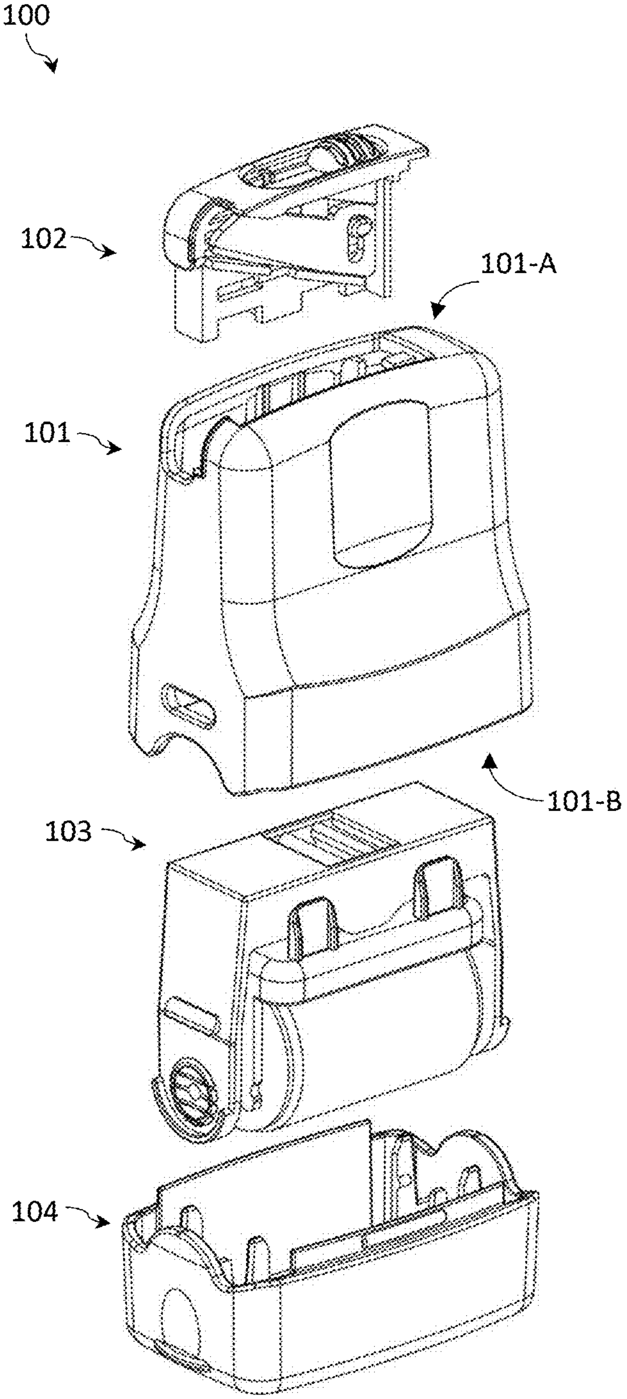
FIG. 1B illustrates an exploded perspective view of a stamp.

FIG. 1A illustrates a perspective view of stamp 100, according to some embodiments of the present disclosure. FIG. 1B illustrates an exploded perspective view of stamp 100, according to some embodiments of the present disclosure. In conjunction with FIG. 1A and FIG. 1B, stamp 100 includes main shell 101, cutting element 102, stamp element 103, and cap 104. Main shell 101 is configured to receive cutting element 102 at its top side 101-A. In addition, main shell 101 is also configured to receive stamp element 103 at its bottom side 101-B. Cap 104 is configured to couple to main shell 101 at bottom side 101-B. Stamp element 103 may be disposed between main shell 101 and cap 104.

Figure 2A:
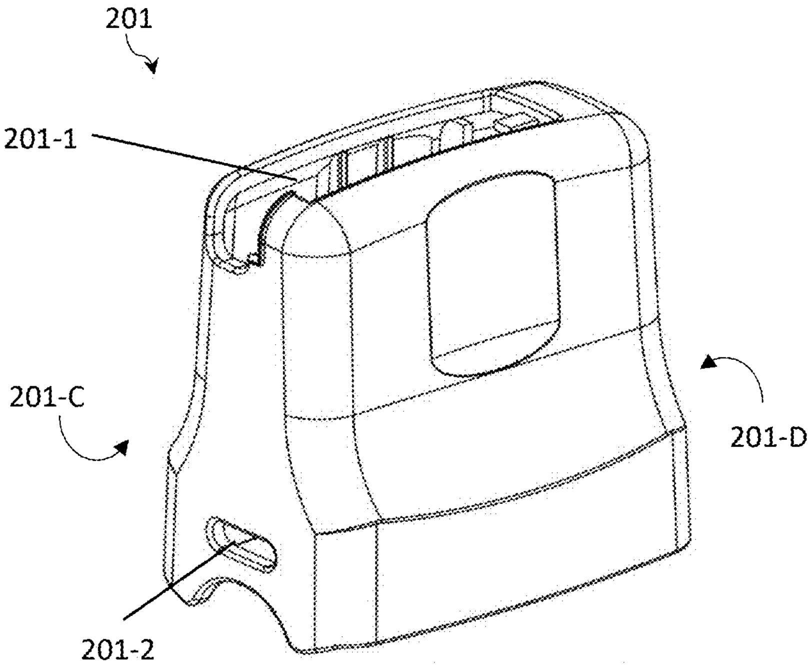
FIG. 2A illustrates a perspective view of a main shell of a stamp.
Figure 2B:
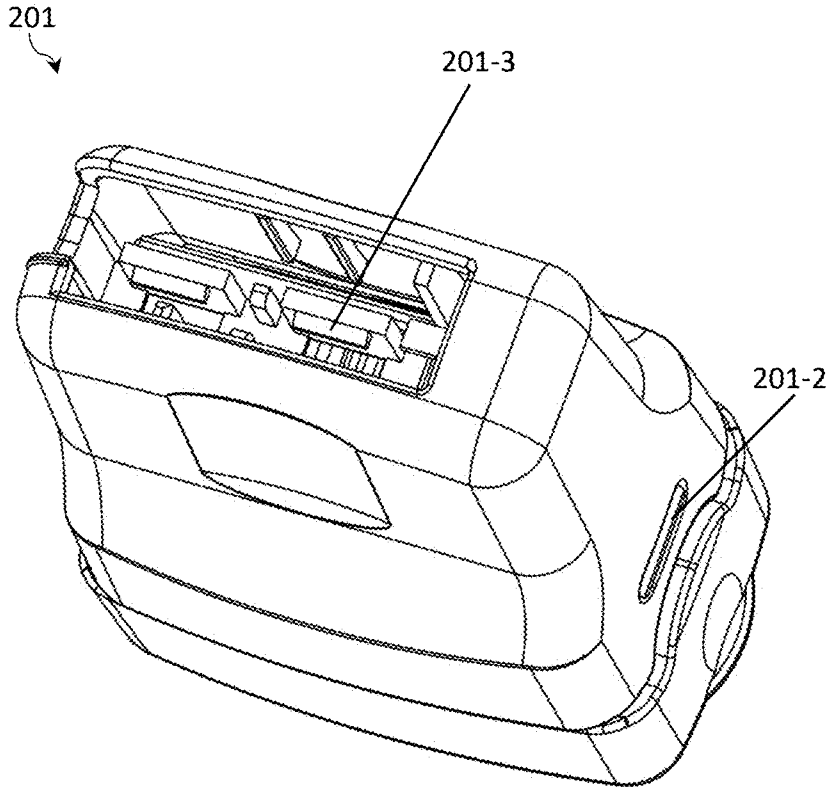
FIG. 2B illustrates a top perspective view of the main shell.

FIG. 2A illustrates a perspective view of main shell 201, according to some embodiments of the present disclosure. FIG. 2B illustrates a top perspective view of main shell 201, according to some embodiments of the present disclosure. In some embodiments, main shell 201 may corresponds to main shell 101 in FIG. 1B. Referring to FIG. 2A, main shell 201 includes accommodating space 201-1 and buckle hole 201-2. Referring to FIG. 2B, main shell 201 further includes buckle 201-3.

In some embodiments, in conjunction with FIG. 1B, accommodating space 201-1 is configured to receive cutting element 102 at top side 101-A of main shell 101. Referring to FIG. 2A, buckle hole 201-2 is positioned on side 201-C of main shell 201. A corresponding buckle hole 201-2 (not shown) is positioned on side 201-D of main shell 201. In conjunction with FIG. 1B, buckle 201-3 is configured to lock cutting element 102 received in accommodating space 201-1.

Figure 3A:
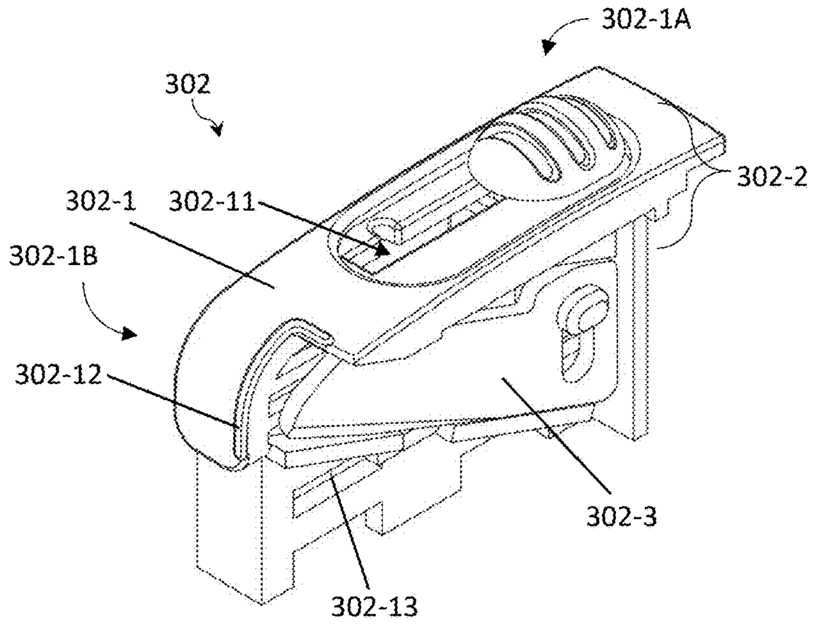
FIG. 3A illustrates a perspective view of a cutting element of a stamp.
Figure 3B:
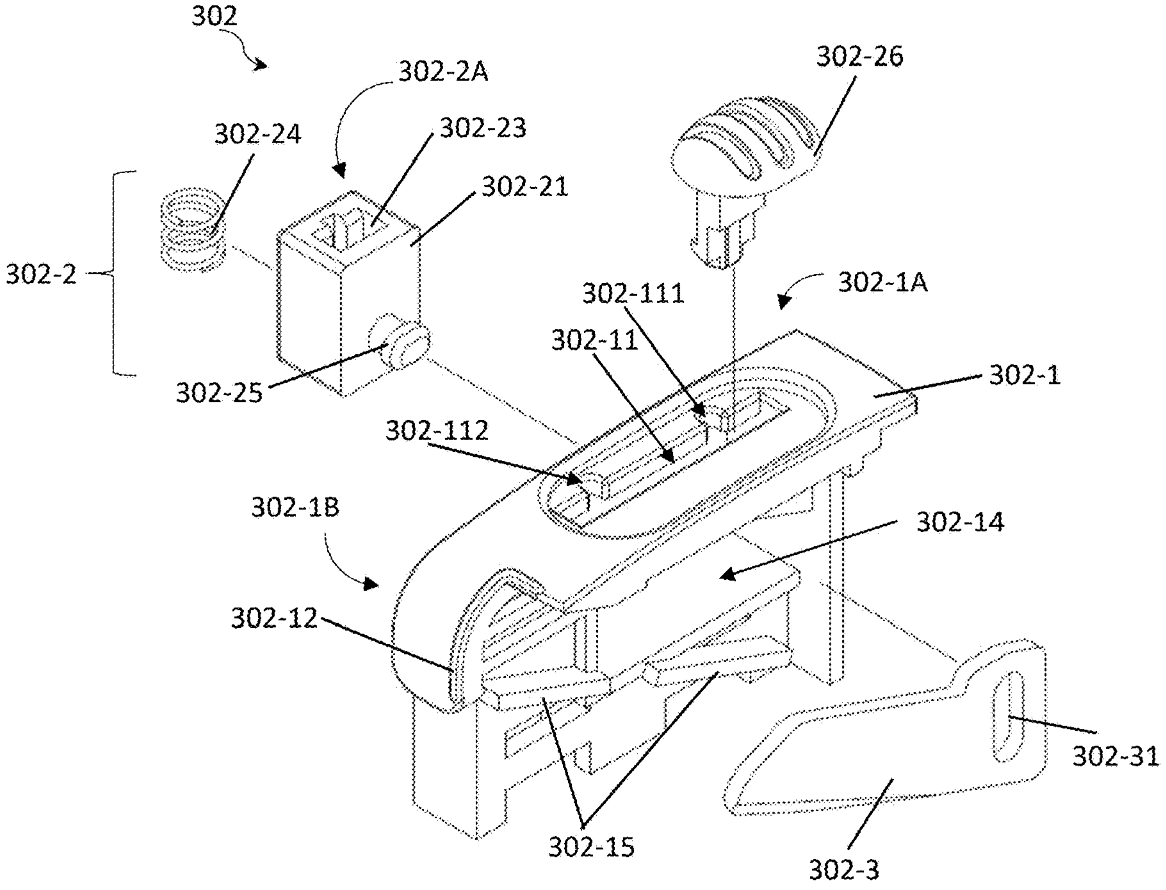
FIG. 3B illustrates an exploded perspective view of the cutting element.
Figure 3C:
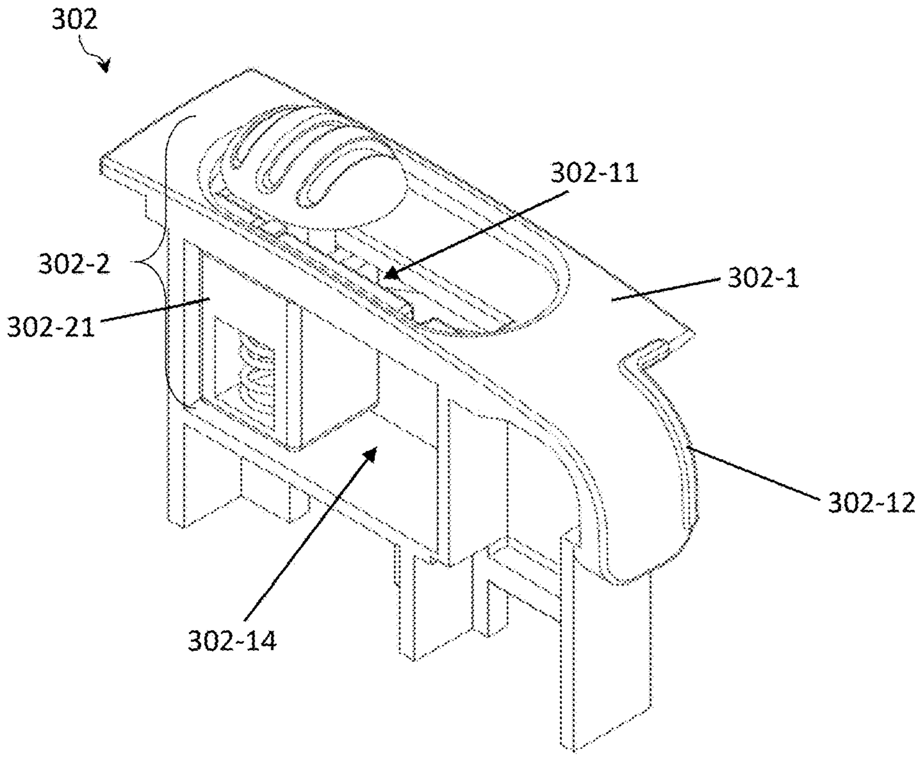
FIG. 3C illustrates a reversed perspective view of the cutting element.
Figure 3D:
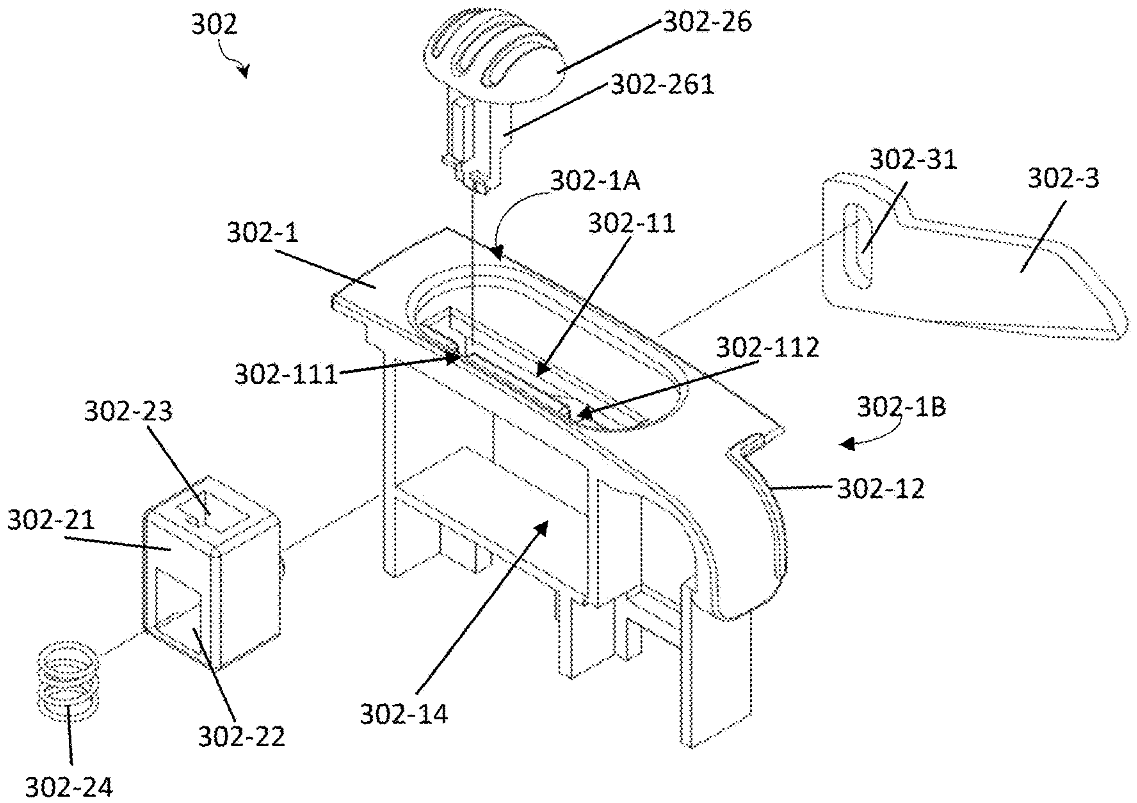
FIG. 3D illustrates a reversed exploded perspective view of the cutting element.

FIG. 3A illustrates a perspective view of cutting element 302, FIG. 3B illustrates an exploded perspective view of cutting element 302, FIG. 3C illustrates a reversed perspective view of cutting element 302 and FIG. 3D illustrates a reversed exploded perspective view of cutting element 302, all arranged according to some embodiments of the present disclosure. In some embodiments, cutting element 302 corresponds to cutting element 102 in FIG. 1B. In some embodiments, referring to FIG. 3A, cutting element 302 includes main body 302-1, control part 302-2, and cutting part 302-3.

In some embodiments, referring to FIG. 3A, main body 302-1 includes groove 302-11, opening edge 302-12, and buckle hole 302-13. In some embodiments, referring to FIG. 3B, main body 302-1 further includes housing space 302-14 and track 302-15.

In some embodiments, groove 302-11 is positioned on top side 302-1A of main body 302-1. Referring to FIG. 3B, groove 302-11 further includes first positioning hole 302-111 and second positioning hole 302-112. In conjunction with FIG. 3A and FIG. 3B, opening edge 302-12 is positioned on or near corner region 302-1B of main body 302-1. In conjunction with FIG. 2B, buckle hole 302-13 is configured to couple with buckle 201-3 so that cutting element 302 can be locked in main shell 201. Referring to FIG. 3C, housing space 302-14 is configured to accommodate control part 302-2.

In some embodiments, referring to FIG. 3B, control part 302-2 includes control body 302-21, channel 302-23, elastic element 302-24, couple part 302-25 and push member 302-26. In some embodiments, referring to FIG. 3D, control part 302-2 further includes housing area 302-22.

In some embodiments, referring to FIG. 3C, control body 302-21 is configured to be disposed in housing space 302-14. In some embodiments, referring to FIG. 3D, housing area 302-22 is defined in control body 302-21 to accommodate elastic element 302-24. In some embodiments, referring to FIG. 3B, channel 302-23 is defined on top side 302-2A of control part 302-2 and extends downwardly to communicate with housing area 302-22. In some embodiments, still referring to FIG. 3B, couple part 302-25 is configured to engage with couple hole 302-31 of cutting part 302-3.

In some embodiments, referring to FIG. 3D, push member 302-26 includes leg 302-261. Leg 302-261 is configured to be received in channel 302-23. Therefore, push member 302-26 is configured to engage with control body 302-21 when leg 302-261 is received in channel 302-23. In response to leg 302-261 being received in channel 302-23, elastic element 302-24 is configured to elastically abut leg 302-261.

In some embodiments, referring to FIG. 3D, in response to push member 302-26 being at first positioning hole 302-111 on top side 302-1A of main body 302-1, elastic element 302-24 is configured to lift push member 302-26 upwardly so that push member 302-26 is positioned at first positioning hole 302-111. Similarly, in response to push member 302-26 being at second positioning hole 302-112 on top side 302-1A of main body 302-1, elastic element 302-24 is configured to lift push member 302-26 upwardly so that push member 302-26 is positioned at second positioning hole 302-112.

In some embodiments, in conjunction with FIG. 1B, top side 302-1A of main body 302-1 corresponds to top side 101-A of main shell 101. Therefore, first positioning hole 302-111 and second positioning hole 302-112 on top side 302-1A may be on top side 101-A of main shell 101 but are not in any corner region of main shell 101.

Figure 3E:
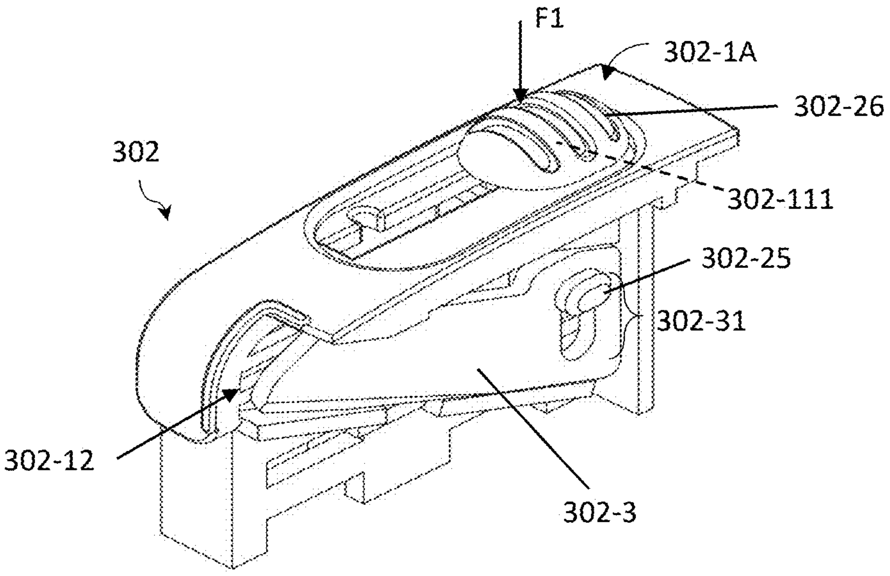
FIG. 3E illustrates a perspective view of the cutting element in response to a push member of a stamp at a first positioning hole.
Figure 3F:
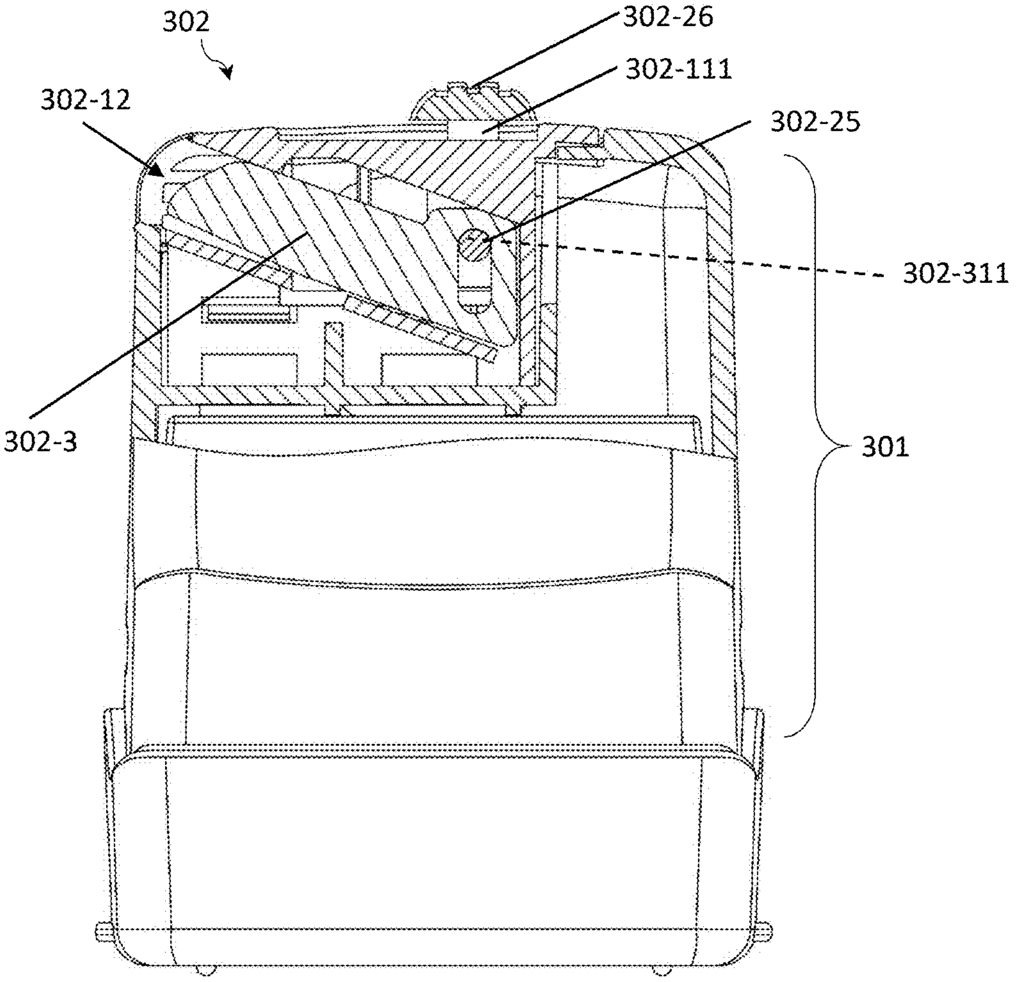
FIG. 3F illustrates another perspective view of the cutting element received in a main shell of the stamp in response to the push member at the first positioning hole.

In some embodiments, push member 302-26 is configured to move between first positioning hole 302-111 and second positioning hole 302-112 along groove 302-11. FIG. 3E illustrates a perspective view of cutting element 302 in response to push member 302-26 at first positioning hole 302-111 and FIG. 3F illustrates another perspective view of cutting element 302 received in main shell 301 in response to push member 302-26 at first positioning hole 302-111, both arranged according to some embodiments of the present disclosure. Referring to FIG. 3E, in some embodiments, couple part 302-25 is configured to engage with couple hole 302-31 of cutting part 302-3. More specifically, couple part 302-25 is at first position 302-311 of couple hole 302-31. First position 302-311 may be at a higher position of couple hole 302-31. For example, first position 302-311 may be the top end of couple hole 302-31. In response to push member 302-26 at first positioning hole 302-111, cutting part 302-3 is in main shell 301 and is not protruded from opening edge 302-12.

In some embodiments, in response to first force F1 substantially vertical to top side 302-1A being applied to push member 302-26 at first positioning hole 302-111, in conjunction with FIG. 3D, leg 302-261 is configured to compress elastic element 302-24 so that push member 302-26 is released from first positioning hole 302-111.

Figure 3G:
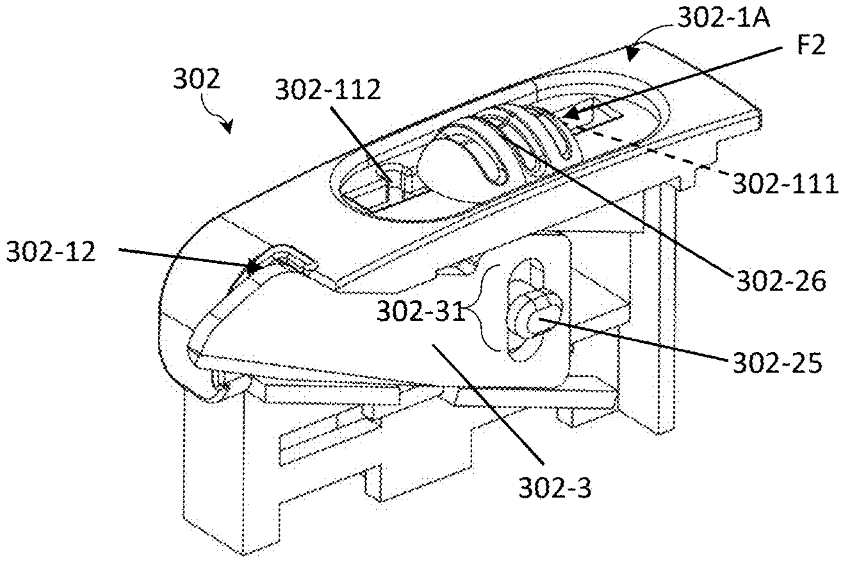
FIG. 3G illustrates a perspective view of the cutting element in response to a push member of a stamp between the first positioning hole and a second positioning hole.
Figure 3H:
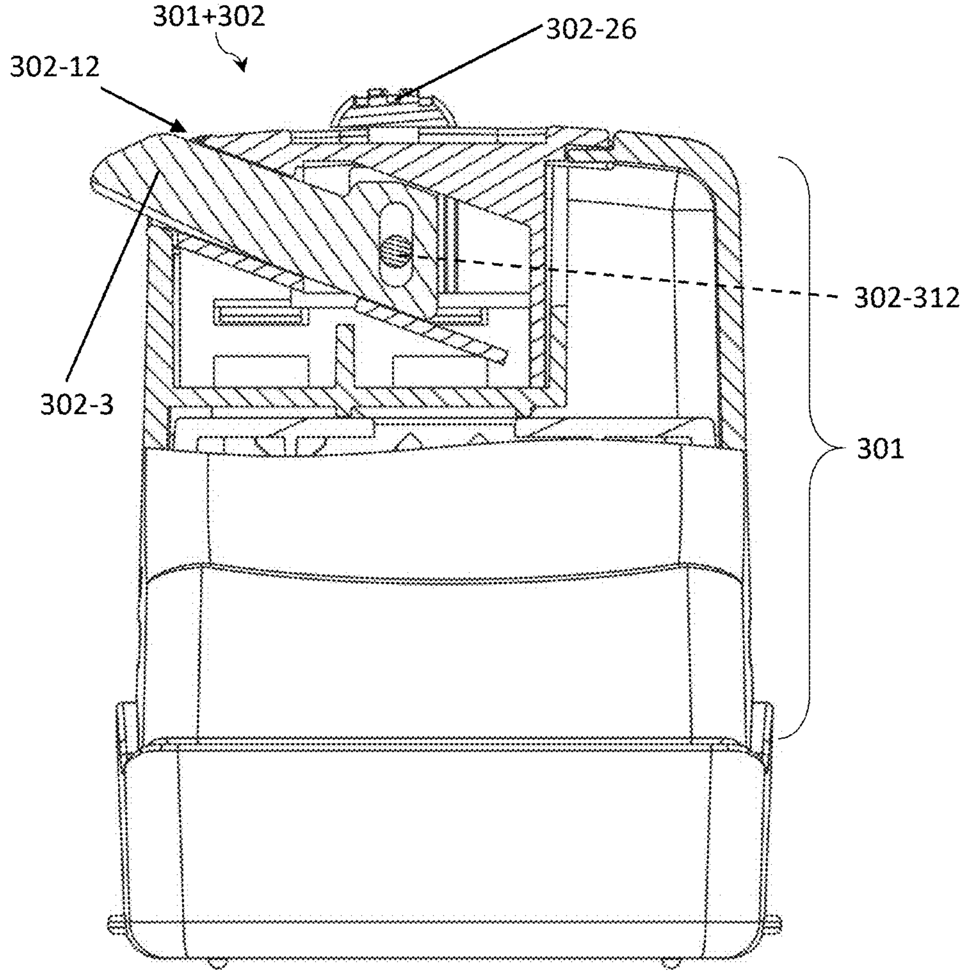
FIG. 3H illustrates another perspective view of the cutting element received in the main shell in response to the push member between the first positioning hole and the second positioning hole.

FIG. 3G illustrates a perspective view of cutting element 302 in response to push member 302-26 between first positioning hole 302-111 and second positioning hole 302-112 and FIG. 3H illustrates another perspective view of cutting element 302 received in main shell 301 in response to push member 302-26 between first positioning hole 302-111 and second positioning hole 302-112, both arranged according to some embodiments of the present disclosure.

In some embodiments, in conjunction with FIG. 3D, in response to second force F2 substantially horizontal to top side 302-1A being applied to released push member 302-26, released push member 302-26 is configured to move from first positioning hole 302-111 toward second positioning hole 302-112. More specifically, push member 302-26 is configured to drive control body 302-21 to move in housing space 302-14 along top side 302-1A.

In some embodiments, in conjunction with FIG. 3B and FIG. 3D, a movement of control body 302-21 along top side 302-1A in housing space 302-14 may drive a movement of cutting part 302-3 along track 302-15 based on couple part 302-25 engaged in couple hole 302-31. In addition, the movement of control body 302-21 along top side 302-1A in housing space 302-14 may also drive a movement of couple part 302-25 along couple hole 302-31. Referring to FIG. 3G and FIG. 3H, couple part 302-25 is at second position 302-312 of couple hole 302-31. Second position 302-312 may be lower than first position 302-311 in couple hole 302-31. For example, second position 302-312 may be between the top end and the bottom end of couple hole 302-31. In response to push member 302-26 moving from first positioning hole 302-111 toward second positioning hole 302-112, some portions of cutting part 302-3 is protruded from opening edge 302-12.

Figure 3I:
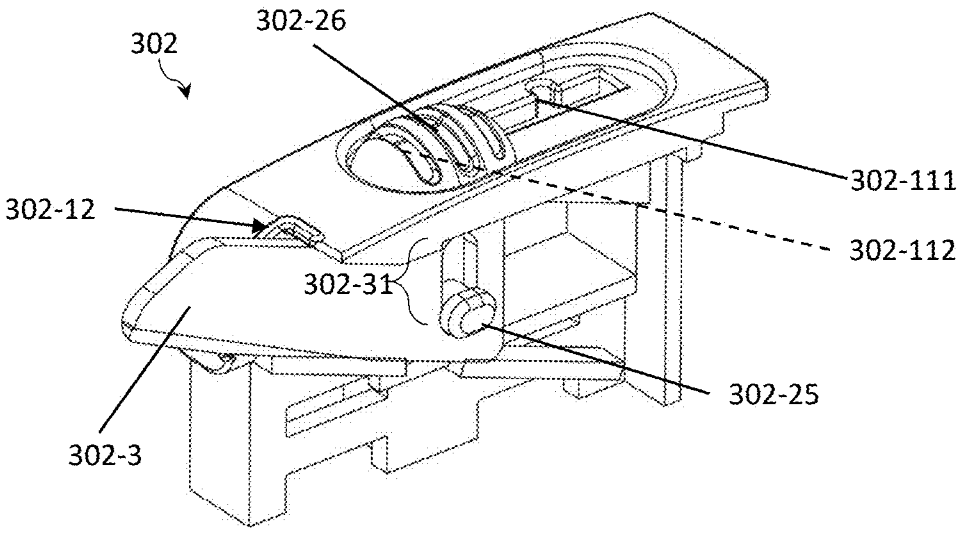
FIG. 3I illustrates a perspective view of the cutting element in response to the push member at the second positioning hole.
Figure 3J:
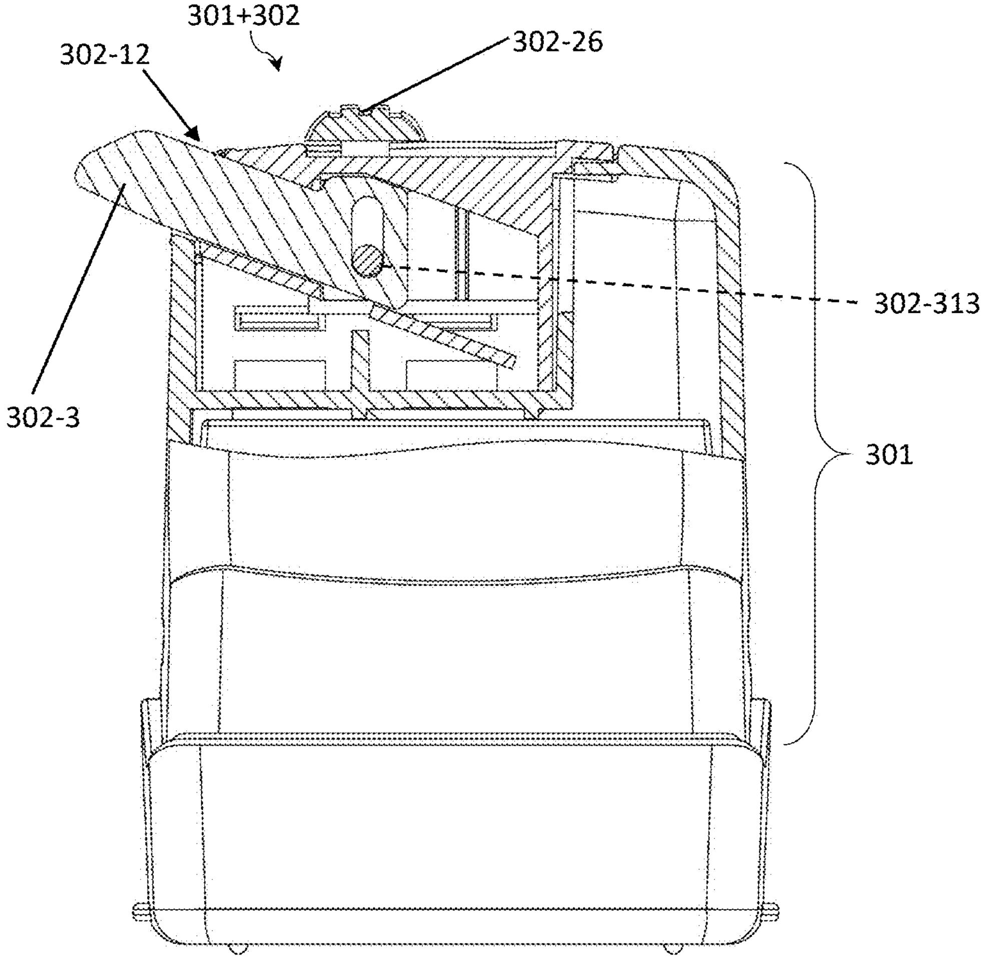
FIG. 3J illustrates another perspective view of the cutting element received in the main shell in response to the push member at the second positioning hole.

FIG. 3I illustrates a perspective view of cutting element 302 in response to push member 302-26 at second positioning hole 302-112 and FIG. 3H illustrates another perspective view of cutting element 302 received in main shell 301 in response to push member 302-26 at second positioning hole

302-112, both arranged according to some embodiments of the present disclosure. Referring to FIG. 3I, in some embodiments, in response to push member 302-26 being moved to second positioning hole 302-112, couple part 302-25 is at third position 302-313 of couple hole 302-31. Third position 302-313 may be at a lower position of couple hole 302-31. For example, third position 302-313 may be the bottom end of couple hole 302-31. In response to push member 302-26 at second positioning hole 302-112, cutting part 302-3 is protruded from opening edge 302-12.

In some embodiments, cutting part 302-3 may be received in main shell 301 in response to moving push member 302-26 from second positioning hole 302-112 back to first positioning hole 302-111. Operations involved by moving push member 302-26 from second positioning hole 302-112 back to first positioning hole 302-111 may be similar to the operations described above.

Figure 4A:
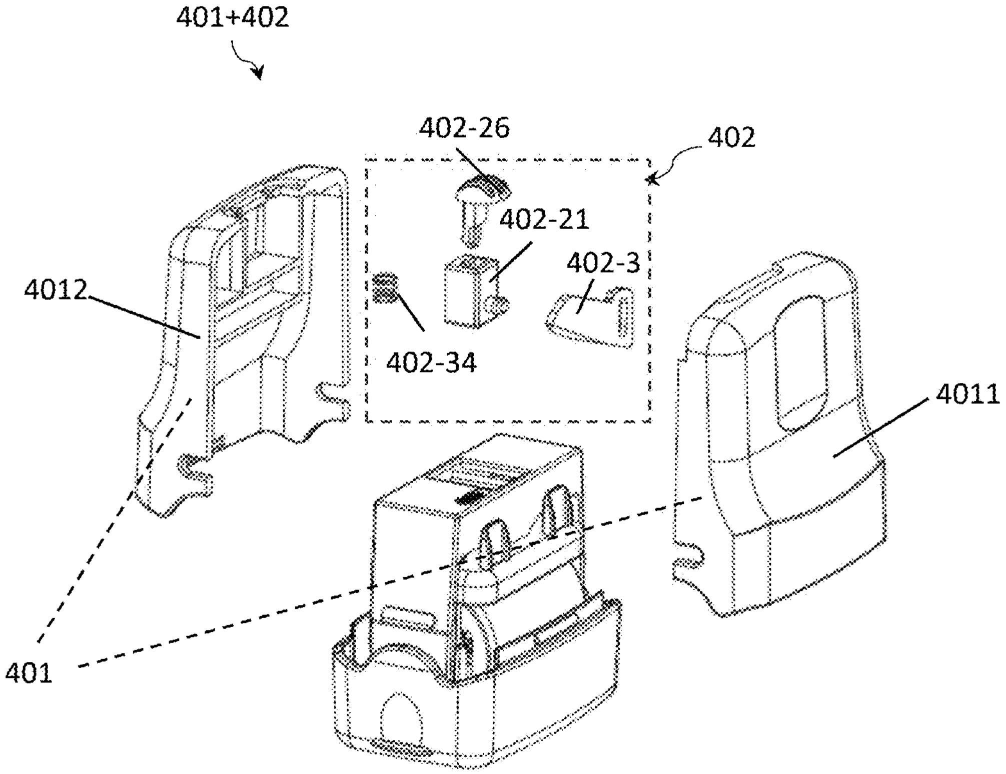
FIG. 4A illustrates an exploded perspective view of a combination of a main shell of a stamp and a cutting element set of the stamp.
Figure 4B:
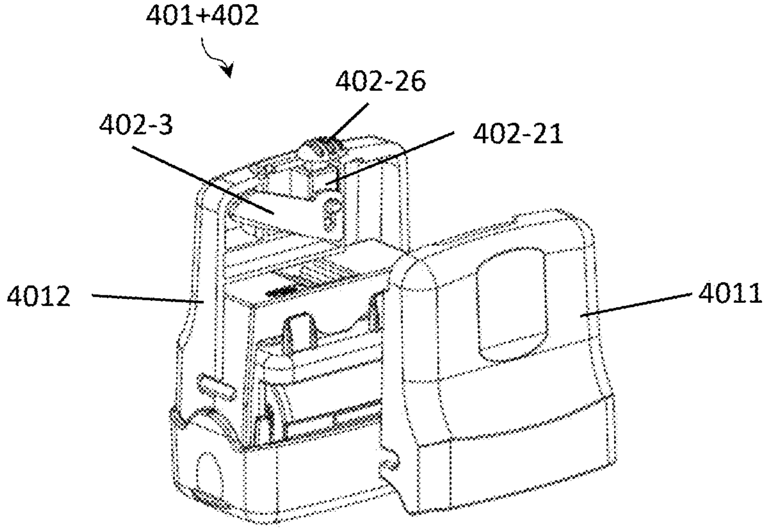
FIG. 4B is another exploded perspective view of the combination of the main shell and the cutting element set.

FIG. 4A illustrates an exploded perspective view of a combination of main shell 401 and cutting element set 402, according to some embodiments of the present disclosure. In some embodiments, main shell 401 includes two separate parts 4011/4012. In some embodiments, parts 4011/4012 may be manufactured by molding. In some embodiments, parts 4011/4012 are configured to receive control body 402-21, spring 402-34, push member 402-26, and cutting part 402-3 in main shell 401, as illustrated in FIG. 4B which is another exploded perspective view of a combination of main shell 401 and cutting element set 402, according to some embodiments of the present disclosure. In conjunction with FIG. 3A, it is worth noting that main body 302-1 in FIG. 3A may be integrated with main shell 401 and formed a part of parts 4011/4012.

Figure 5A:
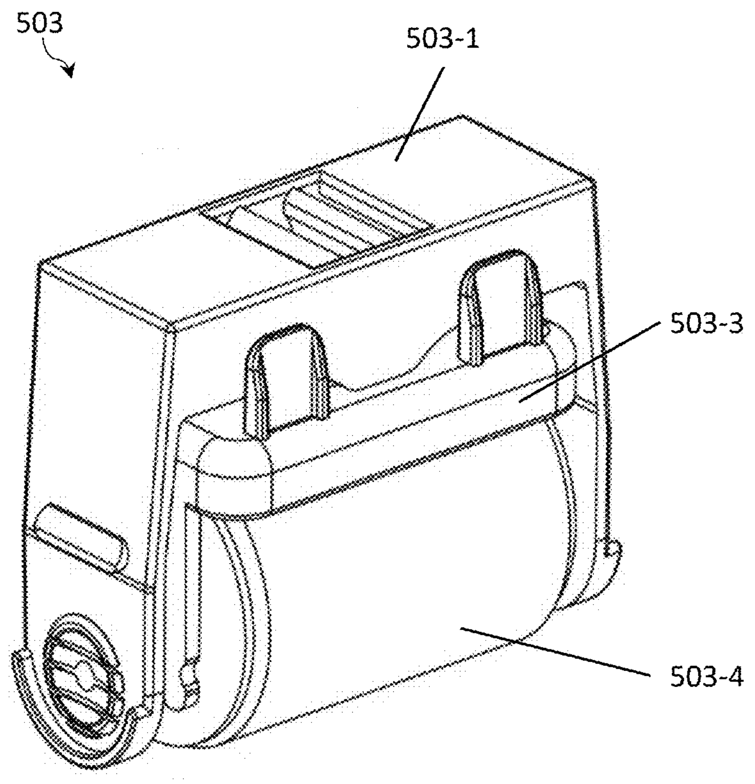
FIG. 5A illustrates a perspective view of a stamp element of a stamp.

FIG. 5A illustrates a perspective view of stamp element 503 arranged according to some embodiments of the present disclosure. In some embodiments, stamp element 503 includes holding frame 503-1, tray 503-3 and stamp member 503-4.

Figure 5B:
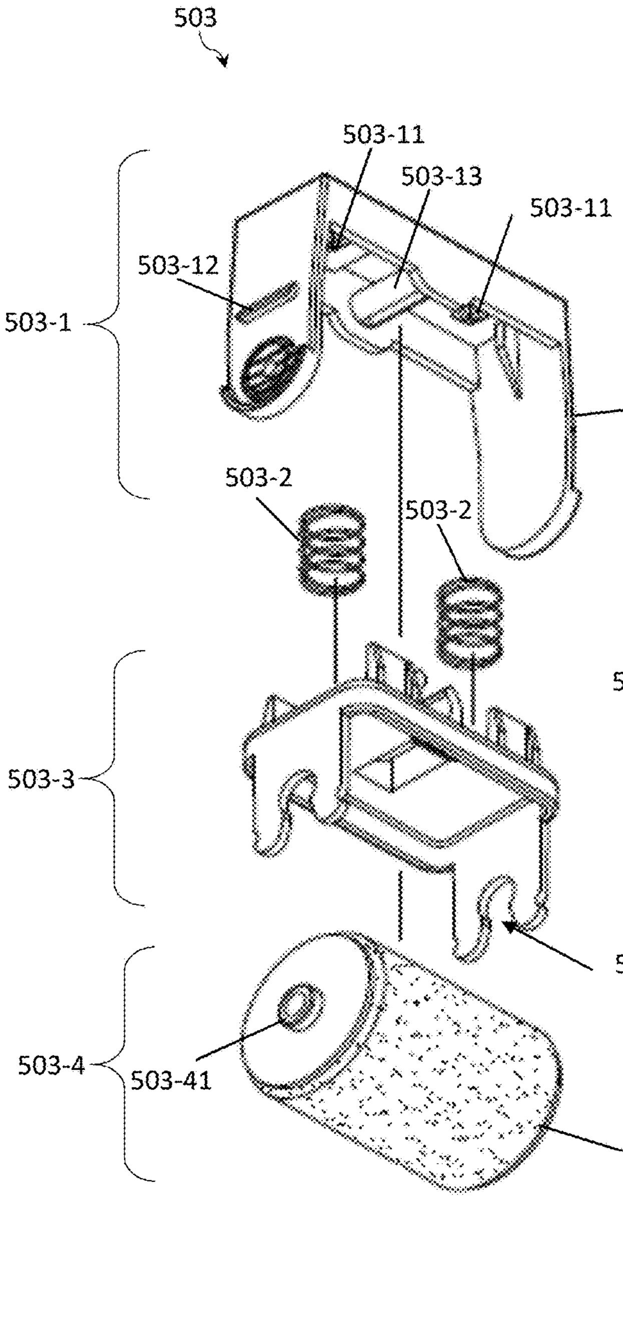
FIG. 5B illustrates an exploded perspective view of the stamp element.
Figure 5C:
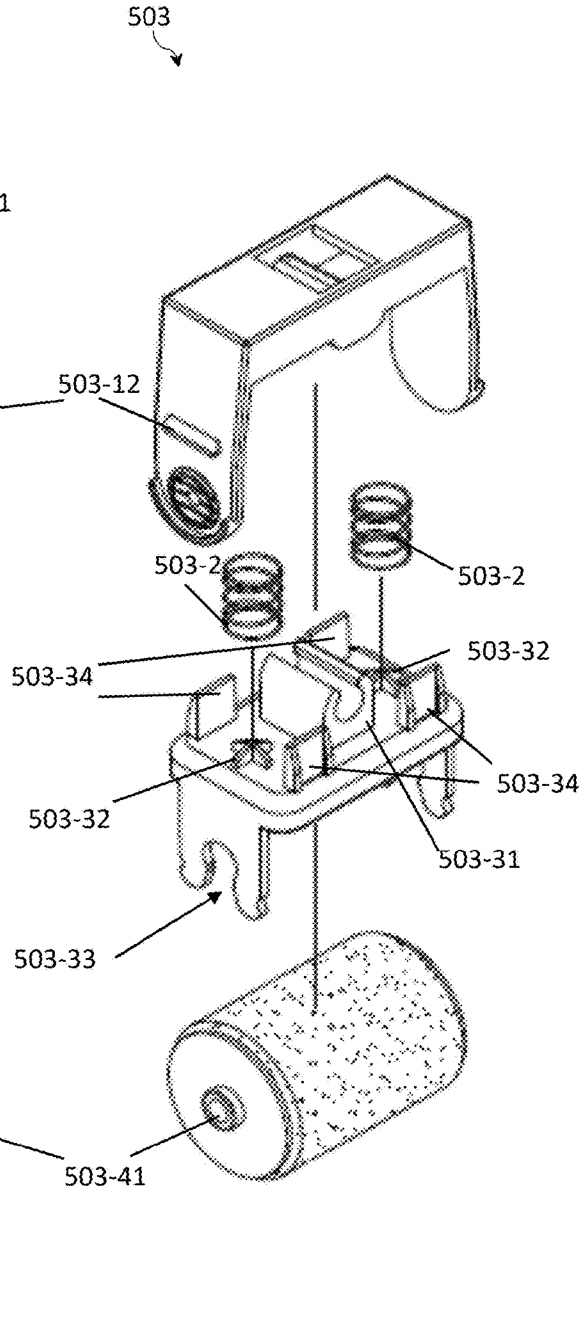
FIG. 5C illustrates a reversed exploded perspective view of the stamp element.

FIG. 5B illustrates an exploded perspective view of stamp element 503 and FIG. 5C illustrates a reversed exploded perspective view of a stamp element 503, both arranged according to some embodiments of the present disclosure. In some embodiments, stamp element 503 further includes a pair of elastic members 503-2.

In some embodiments, in conjunction with FIG. 5B and FIG. 5C, holding frame 503-1 may be a U-shaped structure. In some other embodiments, holding frame 503-1 may be in other feasible forms, such as a plate. In some embodiments, holding frame 503-1 includes a pair of blocking members 503-11, a pair of buckles 503-12, and pivot joint 503-13. Blocking members 503-11 may be positioned on an inner side of holding frame 503-1. The pair of buckles 503-12 may be positioned on two outer sides of holding frame 503-1, respectively. In conjunction with FIG. 2A, the pair of buckles 503-12 is configured to couple with buckle holes 201-2. Pivot joint 503-13 is positioned on the inner side of holding frame 503-1 and is between the pair of blocking members 503-11.

In some embodiments, tray 503-3 includes pivot C buckle 503-31, a pair of blocking members 503-32, a pair of C buckles 503-33, and one or more positioning member 503-34. In some embodiments, pivot C buckle 503-31 is positioned on a side of tray 503-3 and is configured to engage with pivot joint 503-13 of holding frame 503-1. After pivot C buckle 503-31 engages with pivot joint 503-13, tray 503-3 is configured to tilt back and forth with respect to holding frame 503-1. In an alternative embodiment, pivot joint 503-13 and pivot C buckle 503-31 may be switched so that tray 503-3 is still capable of tilting back and forth with respect to holding frame 503-1. In other words, tray 503-3 may include pivot joint 503-13, and holding frame 503-1 may include pivot C buckle 503-31 in the alternative embodiment.

In some embodiments, elastic members 503-2 are disposed between holding frame 503-1 and tray 503-3. In some embodiments, the positions of blocking members 503-11 may correspond to the positions of blocking members 503-32. Accordingly, in response to holding frame 503-1 and tray 503-3 being engaged with each other, elastic members 503-2 may be disposed and compressed between blocking members 503-11 and blocking members 503-32, respectively. Accordingly, elastic members 503-2 may provide an elastic force to holding frame 503-1 and tray 503-3. In addition, one or more positioning members 503-34 are also configured to confine elastic members 503-2 between holding frame 503-1 and tray 503-3.

In some embodiments, stamp member 503-4 includes a pair of hinge joints 503-41. Hinge joints 503-41 is configured to couple to C buckles 503-33 of tray 503-3 so that stamp member 503-4 is engaged with tray 503-3. In some embodiments, stamp member 503-4 may be one of, single printing surface stamp, multiple printing surfaces or cylinder printing surface stamp.

In some other embodiments, in conjunction with FIGS. 4A and 4B, holding frame 503-1 may be integrated in main shell 401 to be a part of parts 4011/4012. In these embodiments, elastic members 503-2 and tray 503-3 are disposed in main shell 401.

Figure 6:
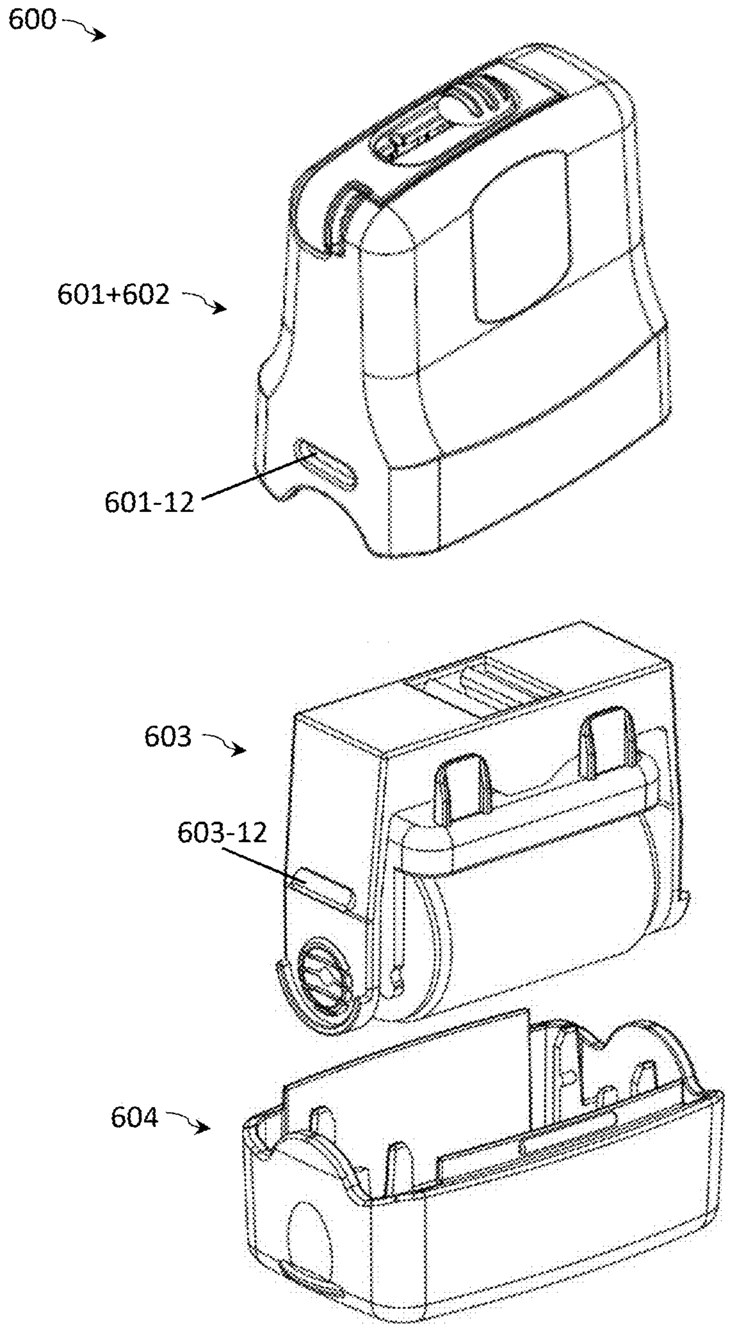
FIG. 6 illustrates an exploded perspective view of a stamp.

FIG. 6 illustrates an exploded perspective view of stamp 600 including stamp element 603, cap 604 and a combination of main shell 601 and cutting element 602, according to some embodiments of the present disclosure. In some embodiments, components in FIG. 6 correspond to their corresponding components in FIG. 1B, FIG. 5B and FIG. 5C. In some embodiments, buckle 603-12 of stamp element 603 is configured to couple to buckle hole 601-12 of main shell 601. In some embodiments, in response to stamp element 603 having been coupled to main shell 601, cap 604 may be coupled to main shell 601 by buckles to accommodate stamp element 603 between main shell 601 and cap 604.

Figure 7A:
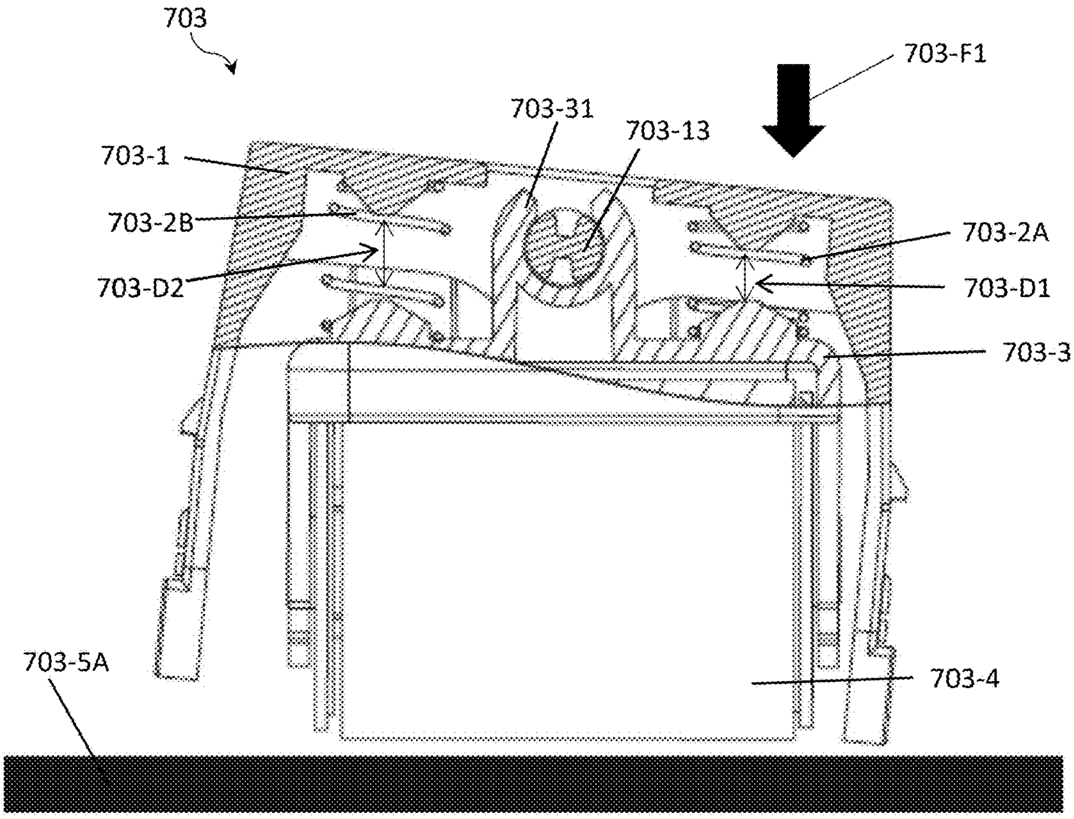
FIG. 7A illustrates a first operation sectional view of a stamp element of a stamp.
Figure 7B:
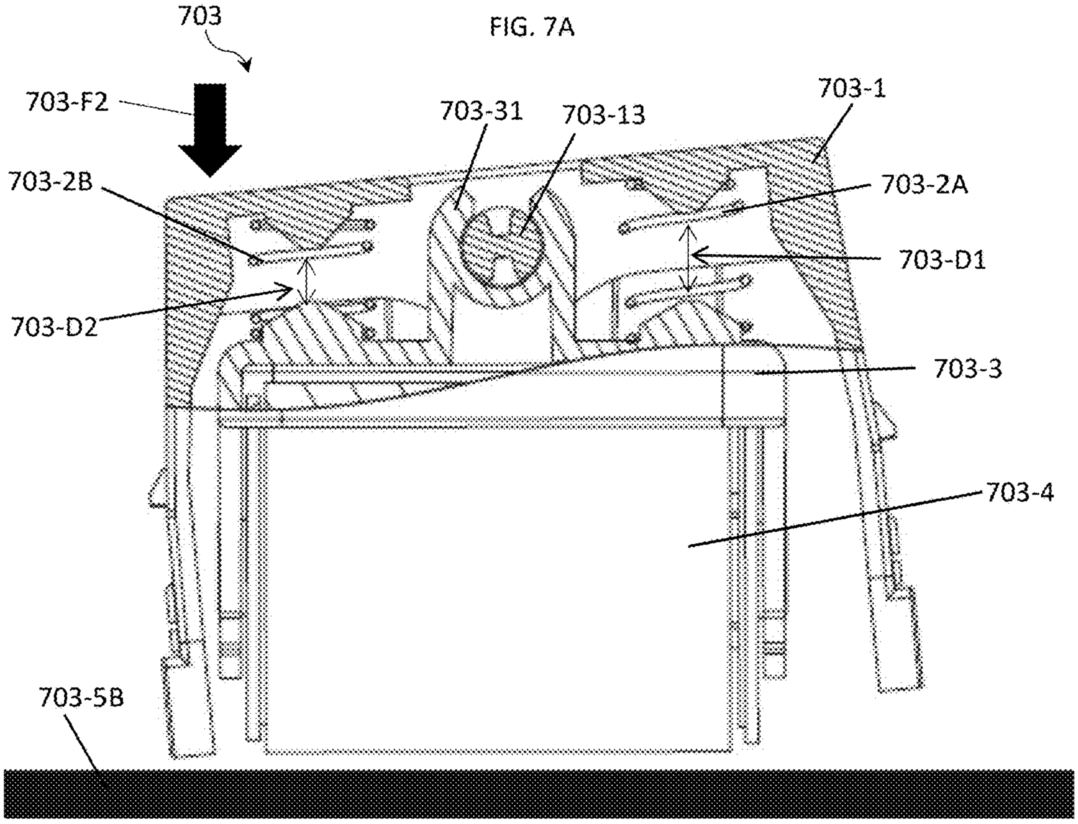
FIG. 7B illustrates a second operation sectional view of the stamp element, all arranged according to some embodiments of the present disclosure.

FIG. 7A illustrates a first operation sectional view of stamp element 703 and FIG. 7B illustrates a second operation sectional view of stamp element 703, both arranged according to some embodiments of the present disclosure. In some embodiments, components in FIG. 7A and FIG. 7B correspond to their corresponding components in FIG. 5B and FIG. 5C.

In some embodiments, referring to FIG. 7A, in response to stamp member 703-4 being applied on surface 703-5A and first force 703-F1 being pressed against a first side of holding frame 703-1, pivot C buckle 703-31 may be activated to move around pivot joint 703-13 so that first elastic member 703-2A is further compressed. Therefore, distance 703-D1 between the first side of holding frame 703-1 and tray 703-3 is decreased and distance 703-D2 between a second side of holding frame 703-1 and tray 703-3 is increased. In conjunction with FIG. 6, after holding frame 703-1 is coupled with a main shell of a stamp, first side of holding frame 703-1 may correspond to a first side of stamp 600. Therefore, in response to first force 703-F1 being pressed against the first side, holding frame 703-1 may tilt toward the first side of stamp 600. In FIG. 7A, although first force 703-F1 is pressed against the specific first side, stamp member 703-4 may still generate uniform patterns on surface 703-5A because second elastic member 703-2B is also configured to provide an elastic force to tray 703-3 and stamp member 703-4. In response to first force 703-F1 being removed from the first side, pivot C buckle 703-31 may be activated to move around pivot joint 703-13 so that first elastic member 703-2A is restored to its uncompressed state and distance 703-D1 is substantially the same as distance 703-D2.

Similarly, in some embodiments, referring to FIG. 7B, in response to stamp member 703-4 being applied on surface 703-5B and second force 703-F2 being pressed against a second side of holding frame 703-1, pivot C buckle 703-31 may be activated to move around pivot joint 703-13 so that second elastic member 703-2B is further compressed. Therefore, distance 703-D2 between the second side of holding frame 703-1 and tray 703-3 is decreased and distance 703-D1 between a first side of holding frame 703-1 and tray 703-3 is increased. In conjunction with FIG. 6, after holding frame 703-1 is coupled with a main shell of a stamp, the second side of holding frame 703-1 may correspond to a second side of stamp 600. Therefore, in response to second force 703-F2 being pressed against the second side, holding frame 703-1 may tilt toward the second side of stamp 600. In FIG. 7B, although second force 703-F2 is pressed against the specific second side, stamp member 703-4 may still generate uniform patterns on surface 703-5B because first elastic member 703-2A is also configured to provide an elastic force to tray 703-3 and stamp member 703-4. In response to second force 703-F2 being removed from the second side, pivot C buckle 703-31 may be activated to move around pivot joint 703-13 so that second elastic member 703-2B is restored to its uncompressed state and distance 703-D2 is substantially the same as distance 703-D1.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A stamp, comprising:

a main shell configured to receive a stamp element; and a cutting element in the main shell, wherein the cutting element further comprises:

a control part including a control body, wherein the control body defines a housing area that accommodates an elastic element;

a push member configured to engage with the control part and move between a first position on a side of the main shell and a second position on the side; and a cutting part configured to protrude from a corner region of the main shell in response to a movement of the push member from the first position to the second position.

2. The stamp of claim 1, wherein the first position and the second position are not in any corner region of the main shell.

3. The stamp of claim 1, wherein the control body further defines a channel, and a leg of the push member is configured to be received in the channel.

4. The stamp of claim 3, wherein the elastic element is configured to elastically abut the leg and lift the push member upwardly at the first position.

5. The stamp of claim 4, in response to a first force substantially vertical to the side being applied to the push member, the leg is configured to compress the elastic element.

6. The stamp of claim 5, in response to a second force substantially horizontal to the side being applied to the push member, the push member is configured to move in a groove along the side from the first position toward the second position.

7. The stamp of claim 6, wherein the push member is configured to drive a movement of the control body in a housing space in the main shell.

8. The stamp of claim 1, wherein the control part further includes a couple part configured to engage with a couple hole of the cutting part.

9. The stamp of claim 8, wherein the couple part is configured to move along the couple hole in response to a first movement of the control part in the main shell.

10. The stamp of claim 9, wherein the cutting part is protruded from the corner region in response to the couple part moving from a first position in the couple hole to a second position in the couple hole.

* * * * *